United States Patent Office 3,330,958
Patented July 11, 1967

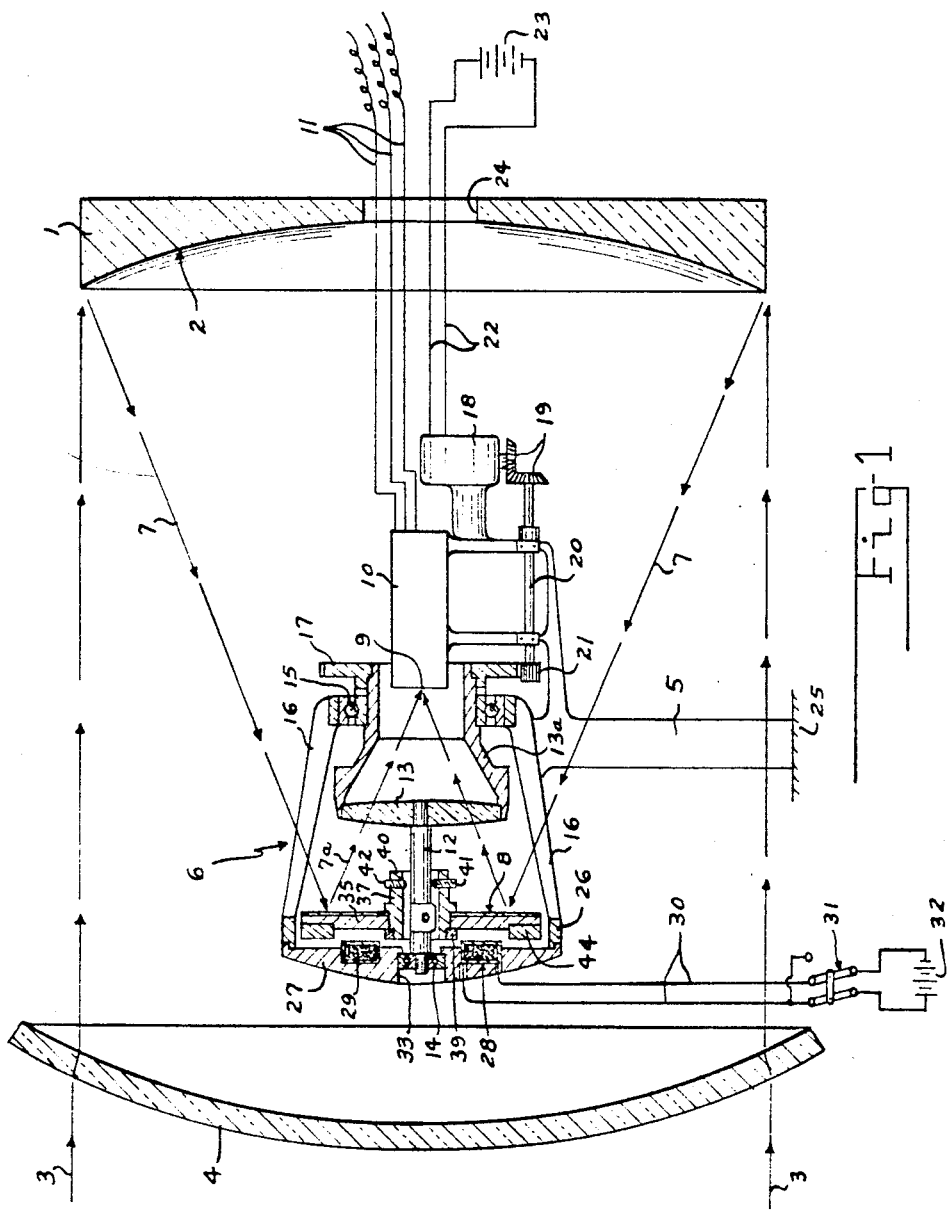

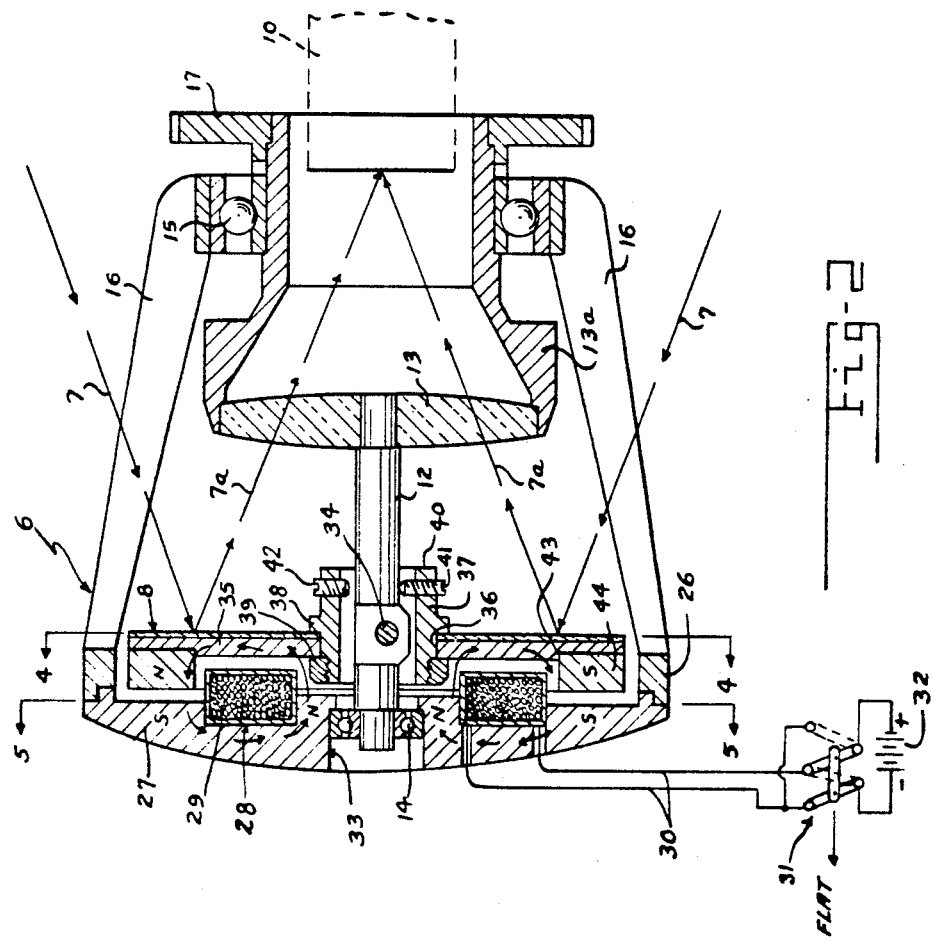

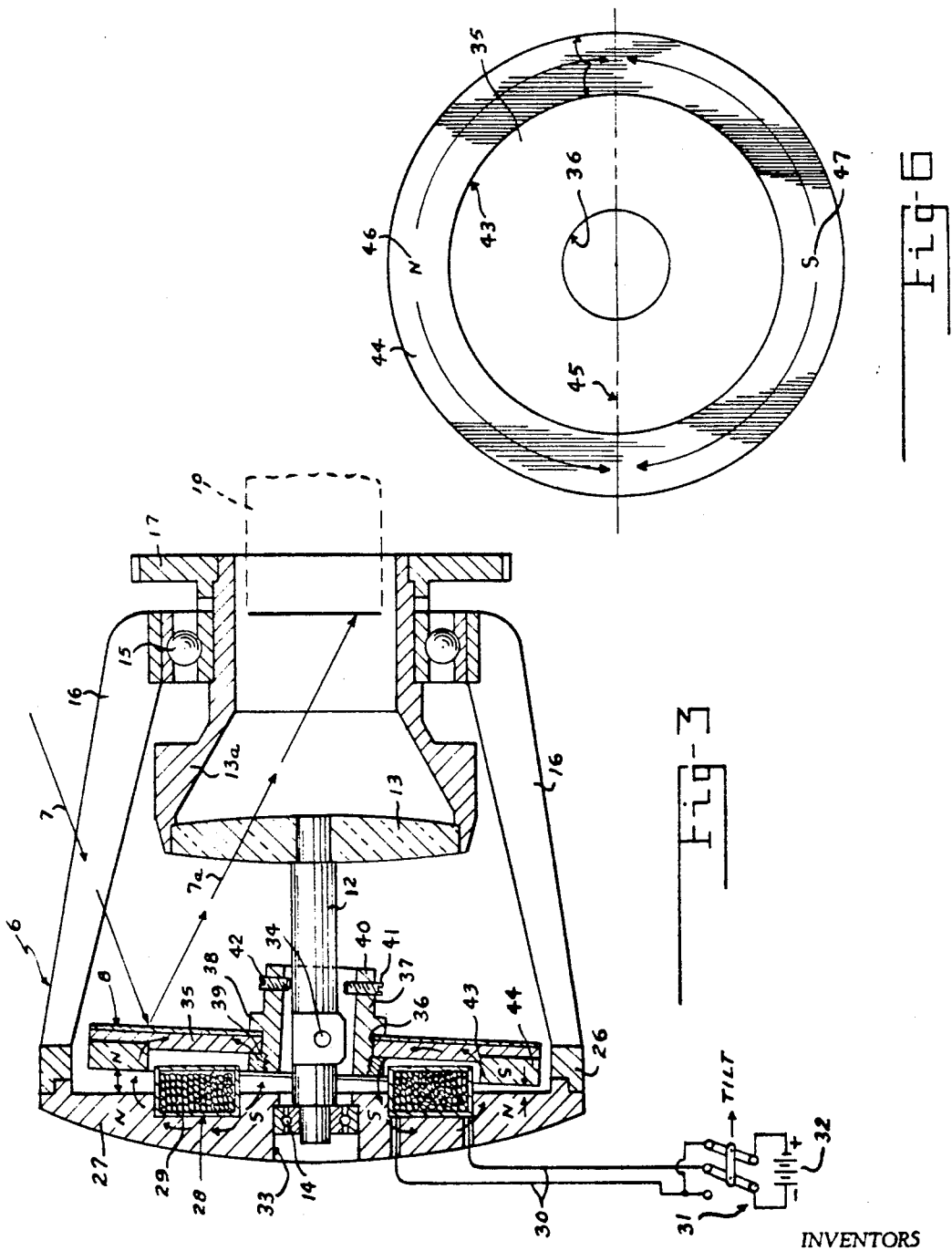

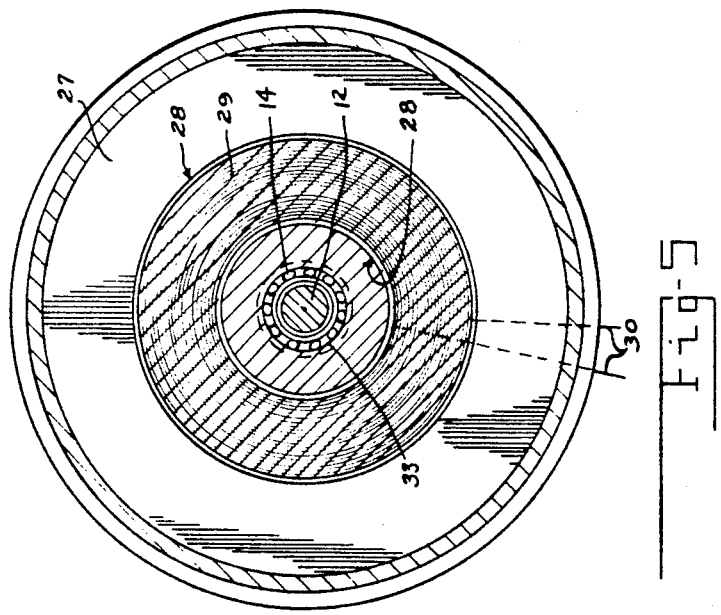
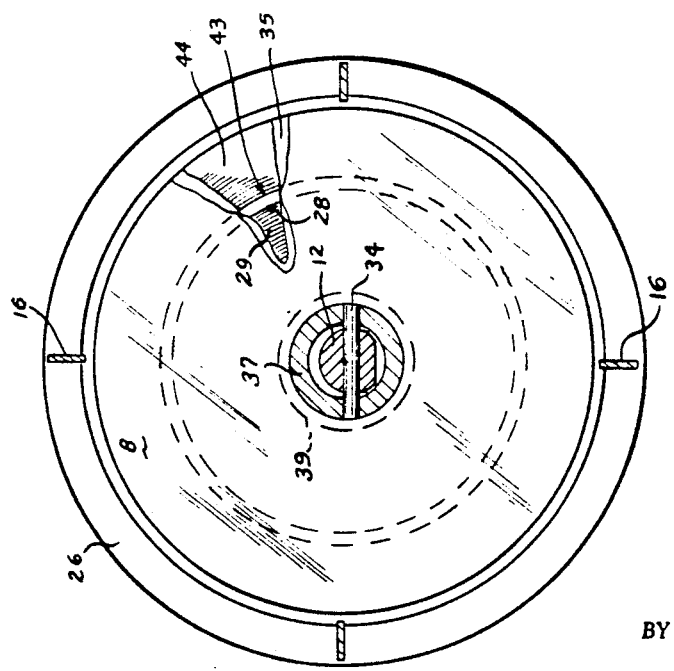
INVENTORS
FRANCIS J. KAISLER
ADAM JENTILET
BY
ATTORNEYS

3,330,958
TILT CONTROL DEVICE FOR SEARCH TRACK OPTICAL SYSTEM
Francis J. Kaisler, Ellicott City, and Adam Jentilet, Glen Burnie, Md., assignors, by mesne assignments, to the United States of America as represented by the Secretary of the Air Force
Filed Aug. 22, 1963, Ser. No. 303,973
7 Claims. (Cl. 250—203)

ABSTRACT OF THE DISCLOSURE

A search and track optical system having folded optics with a rotating pivotally mounted flat mirror receiving rays from a remote target by way of concave mirror which reflects the rays to the flat mirror, which in turn reflects the rays to a detector. A motor rotates the flat mirror and a magnet is provided to selectively tilt the mirror as it rotates between a position perpendicular to its axis of rotation and a second position inclined to the axis of rotation of the flat mirror to provide a nutating motion of the flat mirror.

---

This invention relates to an optical unit for search track systems, primarily for infrared responsive search and track optical systems, and has for an object a new and novel method for controlling the nutating motion of a rotating flat mirror, the flat mirror being part of the optical system wherein it is used to provide a circular image trace area in the focal plane, of a target being observed or picked up by the optical system.

An important object of the invention is the provision of a search and track optical system including folded optics in which a rotating mirror is provided for reflecting the rays received from the target by way of a concave spherical objective mirror, to a focal plane or detector device, which includes means for substantially instantaneously changing the reflecting angle of the flat mirror during uniform rotation thereof between a plane inclined to the axis of rotation of the mirror to provide a nutating motion of the flat mirror and a plane perpendicular to its axis of rotation to eliminate the nutating motion.

A further object is the provision of a reversible magnetic means energized in one polarity direction during continuous rotation of the flat mirror to tilt the mirror in inclined relation to its axis of rotation, and energized in the opposite polarity direction to return the mirror during rotation thereof to a plane perpendicular to its axis of rotation, whereby either a wider nutating optical scan or a narrower scan position is substantially instantly provided.

A further object is the provision of a tiltable rotating circular flat mirror having a concentric permanent ring magnet adjacent its periphery magnetized through its diameter, fastened to the back of the flat mirror with its north-south pole line orientated perpendicular to the tilt axis of the mirror, and includes a fixed concentric field coil electromagnet immediately in back of and spaced from the back of the flat mirror in a plane perpendicular to the mirror's rotative axis having an annular outer pole face opposite the ring magnet and means for selectively reversing the current flow in the electromagnet, whereby when the current is allowed to flow through the coil in a given direction, the outer annular pole face becomes magnetically north, attracting the south pole half of the ring magnet while the other half of the ring magnet is magnetically repelled, exerting magnetic force for quickly moving the flat mirror toward one of its tilted or nontilted flat positions, for instance, to its flat or search position perpendicular to its rotative axis while reversing the current flow reverses the annular outer pole to a south pole condition whereby the north pole half of the ring magnet is attracted while the opposite south pole half is repelled thus tilting the rotating mirror to its opposite position during rotation thereof, for instance, to its inclined position relative to its rotational axis, for nutating motion of the mirror to provide a wider reflection coverage for tracking conditions.

A further object is the provision of adjustable stop means between the pivoted mirror structure and its rotating shaft means for limiting the degree of its pivotal movement in both directions.

A further object of the invention is to permit the use of a heavy current to actuate the armature or permanent ring magnet and its flat mirror substantially instantaneously to either of its search or track positions while only a light or considerably reduced current is required to hold the ring armature and mirror in either of its flat or tilted positions.

Other objects and advantages of the invention will become apparent from the following description and accompanying drawings in which like reference characters refer to like parts in the several figures.

FIG. 1 is a somewhat schematic sectional view, diagrammatically showing one type of optical scanning system having the invention incorporated therein, showing the rotatable mirror in its flat or search position.

FIG. 2 is an enlarged sectional view of the rotating mirror and associated structure of the invention showing the rotatable mirror in its nontilted or search position.

FIG. 3 is a similar sectional view of that illustrated in FIG. 2, showing the effect of reversal of current flow in the electromagnetic coil, tilting the mirror to its inclined or track position.

FIG. 4 is a transverse sectional view taken about on the plane indicated by line 4—4 in FIG. 2, parts being broken away to show a portion of the permanent ring magnet and a portion of the concentric electromagnet.

FIG. 5 is also a transverse sectional view taken about on line 5—5 of FIG. 2 showing the concentric field coil and outer circular pole piece more clearly, whereby reversal of current flow changes this outer circular pole piece between north and south pole conditions.

FIG. 6 is a detail plan view of the rear face of the mirror supporting disk alone, having the permanent ring magnet fixed thereon concentric to the axis of rotation of the disk.

Referring briefly to FIG. 1 of the drawings, the reference numeral 1 illustrates a front surface spherical mirror having a reflecting surface 2 for receiving optical rays, for instance, infrared rays 3 from an infrared source such as a distant target. Spaced forwardly from the mirror 1 is a conventional correction plate 4, well known, for instance, as disclosed in the optical scanning system disclosed in U.S. Patent to W. B. McKnight et al., No. 3,054,899, patented Sept. 18, 1962.

Suitably mounted in front of the concave spherical reflector 2 by any supporting means, such as a rigid supporting bracket or brackets of spider-like form 5 is the improved mirror reflecting system of the subject invention, indicated generally by the reference numeral 6 and shown more clearly in the enlarged detailed views in FIGS. 2 to 6.

The incoming optical rays 3 reflected by the mirror 2, as indicated at 7, strike the rotating flat front surface mirror 8 of the subject invention and are reflected thereby as indicated at 7a to the focal plane 9 where a suitable detector 10 may be located having a suitable conventional signal output circuit 11. The mirror 8 is rotatably and tiltably carried by a shaft and lens assembly 12 and 13 carried on suitable antifriction bearings 14 and 15 within the spider frame 16.

The rear end of this rotative assembly 8, 12, 13 and sleeve 13a carries a drive pinion or gear 17 which rotates the flat mirror assembly at a desired predetermined scanning speed.

One type of drive that may be employed may be a motor 18 driving through suitable gears 19, a shaft 20 carrying a pinion gear 21 meshing with the gear 17 of the spinner assembly, and energized by circuit wires 22 from a battery or generator 23.

This mirror-spinner assembly may be mounted in front of the spherical mirror 2 in other ways, for instance, by a rigid bracket structure (not shown) extending through a central opening 24 in the mirror structure 1 which could also support the infrared detecting means 10, motor 18 and drive shaft 20; however, for illustrative purposes, a flat, edgewise strut 5 is shown projecting from the frame or casing 25 supporting the mirror 2 and correction plate 4.

Referring to the details of the spinner assembly involving the invetnion, the spider arms 16 carry an annular supporting ring 26 which carries a circular electromagnet pole piece or disk having an annular channel or recess 28 in which is concentrically mounted an annular field coil 29 which is energized by an electrical circuit 30 under control of a reversing switch 31, by a battery or other D.C. current source 32.

When current is caused to flow through the coil 29 in one direction, the outer annular portion of the disk is magentized to provide an outer annular north or south magnetic pole, depending upon the position of the current reversing switch 31.

The center of the pole piece 27 is provided with the concentric bearing supporting opening 33 for the front ball bearing 14 for the shaft 12. The just described structure is understood, of course, to be fixed as previously explained in connection with FIG. 1. The rear end of this shaft 12 being fixed in the center of the lens element 13.

The lens element 13 is concentrically fixed in the sleeve 13a which is rotatably carried by the rear ball bearing 15 and driven by the surrounding ring gear or pinion 17. Thus, the shaft 12 is rotated while the disk shaped pole piece 27 remains stationary thus rotating the flat mirror 8.

As seen in FIGS. 2, 3 and 4, the shaft 12 carries a transverse pivot pin 34 located in the plane of the reflecting surface of the tiltable flat mirror 8.

The mirror 8 is fixed on a disk (preferably nonmagnetic) or plate 35 having a central opening 36 receiving the sleeve or hub member 37 journalled for tilting action on the pivot pin 34, the disk 35 being clamped between the annular shoulder 38 and the nut 39 and is thus rotated by the shaft 12.

The hub or sleeve 37 is extended axially toward lens member 13, as indicated at 40, and carries two set screw stop members 41 and 42 at diametrically opposite sides of the extension 40, in a plane perpendicular to the pivotal axis of the hub member 37 on the pivot pin 34.

The stop 41, as seen in FIG. 4, limits the return of the mirror 8 from the tilted position seen in FIG. 3 to its nontilted position in a plane perpendicular to the axis of the shaft 12, as seen in FIG. 2, while the adjustable stop 42 limits or controls the degree of tilt or inclination of the mirror face 8 relative to the axis.

The rear face of the disk 35 has an annular shoulder 43 concentrically seating the permanent ring magnet 44 against this rear face.

The ring magnet 44, as best seen in FIG. 6, may be of alco-nickel composition and is permanently magnetized through a diameter thereof such as 45 so as to provide a north magnetic pole 46 on one side of this diameter and a south magnetic pole 47 on the opposite side. It is important, when the disk and magnet ring are mounted on the hub, that this neutral axis 45 is parallel to, or substantially passes through the pivotal center 34 for the disk and flat mirror 8.

It is obvious that the relative size or diameter of the disk 27 carrying the energizing coil 28 and the tiltable flat mirror 8 and associated structure could and probably would be much smaller than the diameter of the objective spherical mirror structure 1 than the relation shown in FIG. 1.

In the operation of the device, starting with track position as shown in FIG. 3, current flows from the battery 32 through the coil 29 magnetizing the outer portion of the annular electromagnet pole disk, for instance to provide an outer annular north pole opposite the rotating annular permanent magnet ring 44. The semicircular north pole area of the permanent ring magnet is repelled by the north pole area of the annular electromagnet 27 while the opposite or semicircular south pole area of the ring 44 is attracted toward the now annular north pole area of the electromagnet thus maintaining the plate 35 and flat mirror tilted, as it is rotating in the position shown in FIG. 3, thus producing a nutating reflection of the rays 7 from the objective mirror 2, covering a wide tracking field in which the rays are focused at the focal plane 9, or picked up by a suitable conventional detector 10, not particularly forming any part of the invention. The stop member 42 engaging the surface of the shaft 12 determines the degree of tilt, and consequently the tracking field reflected by the mirror as the shaft 12 rotates. The tiltable structure is substantially balanced about the pivot 34 and therefore when the plate is tilted, the energy flowing through the coil 29 can be considerably reduced, until it is desired to change the position of the mirror 8 from track to the narrower search field or area.

When it is desired to change from track to search operation, the reversing switch 31 is shifted from the position shown in FIG. 3 to the full line position shown in FIG. 2. This, of course, reverses the current flow in the annular concentric coil 29 of the electromagnetic disk 27, causing the annular outer pole portion to change, for instance, from the north pole relation shown in FIG. 3 to a south pole relation shown in FIG. 2. Thus, the semi-annular north pole area of the permanent ring magnet 44 is attracted toward the now annular south pole area of the electromagnet while the opposite south pole area of the permanent magnet is repulsed by the now south pole peripheral portion of the electromagnet, causing the tiltable plate and its flat mirror 8 to be substantially instantly snapped to the search position shown in FIG. 2 where the plane of the mirror 8 is perpendicular to the axis of rotation of the shaft 12. Proper adjustment of the stop 41 can be made to limit return of the mirror to the plane which is perpendicular to the axis of rotation of the shaft and eliminate any nutating affect. Again, an increased energizing of the electromagnet can be made to produce a quick or substantially instaneous change over of the mirror 8 between its search to track positions, after which only a low current flow is necessary to retain the rotating mirror 8 in its position perpendicular to its axis of rotation or inclined thereto.

Suitable infrared responsive means may be provided for shifting the mirror from its search to track positions when an infrared target is picked up in the focal plane for instance by a detector 10, however, such means is well known and does not form a part of the invention and is, therefore, not shown or described in detail.

The tilt angle of the mirror 8 between tilt and non-tilt relations is comparatively small, about 1.8 degrees, also the change over between tilt and nontilt can be made very quickly, within ten to thirty milliseconds.

While a permanent ring magnet is shown and described, other forms of permanent magnets can be used, for instance, two half magnets or two bar magnets with their north and south poles arranged to dispose the north pole outwardly on one side of the pivot 34 and the south pole of the other magnet extending outwardly away from the opposite side of the pivot.

The principles of the invention explained in connection with a specific exemplification thereof may suggest many other applications and modifications of the same. It is, accordingly, desired that, in construing the breadth of the appended claims, they shall not be limited to the specific details shown and described in connection with exemplification thereof. Therefore, what is desired to be secured by Letters Patent is:

We claim:

1. In an optical ray reflecting device a shaft, means for rotating said shaft about a fixed axis, a concentric hub member pivoted on said shaft on an axis transverse to said shaft axis, a circular flat mirror concentrically fixed on said hub member perpendicular to the axis thereof for rotation with said shaft, stop means between said hub member and said shaft for limiting the tilting movement of said hub member on said shaft between a position concentric to said shaft axis and a predetermined tilted position relative to said shaft axis, to dispose the flat reflecting surface of said mirror respectively perpendicular to said shaft axis or in predetermined tilted relation to said shaft axis, permanent magnet means fixedly disposed at and relative to the back of said flat mirror having a north pole portion adjacent the periphery of the mirror at one side of the pivotal axis of the hub member and a south pole portion adjacent the periphery of the back of said flat mirror at the opposite side of said pivotal axis of said hub member, fixed annular electromagnet means concentric to the axis of said shaft having its periphery disposed in spaced adjacent relation to the periphery and back of said flat mirror and said permanent magnet means, including a concentric energizing coil therein intermediate its periphery and center for energizing the said fixed annular electromagnet means incident to current flow in one direction to provide an annular outer north pole portion adjacent the periphery of said electromagnet means and responsive to reverse current flow in said energizing coil to provide an annular outer south pole portion adjacent the periphery of said electromagnet means, whereby when said electromagnet means is energized by current flow in one direction the outer pole portions of said permanent magnet means at one side of said pivotal axis is attracted for tilting said flat mirror in one direction, and upon reversal of current flow in said energizing coil the outer pole portion of said permanent magnet means at the opposite side of said pivotal axis is attracted to move said mirror about said pivotal axis in the opposite direction during rotation of said mirror by said shaft.

2. In an optical infrared ray reflecting rotating mirror device, a drive shaft journaled for rotation about a fixed axis, a hub member concentrically surrounding said shaft, transverse pivot means between said shaft and said hub member having a tilt axis perpendicular to the axis of said shaft, a flat mirror concentrically fixed on said hub member perpendicular to the axis of said hub member for rotation and tilting movements therewith, stop means between said hub member and said shaft for limiting tilting movements of said hub member between a position concentric to said shaft axis and a predetermined inclined relation to said shaft axis, to disposed said flat mirror in a plane perpendicular to said shaft axis or in a predetermined plane inclined to said shaft axis, permanent magnet means fixed relative to the back of said flat mirror having an outer north pole portion adjacent the periphery of the back of said mirror at one side of said tilt axis in a plane perpendicular to said tilt axis and an outer south pole portion adjacent said periphery at the diametrically opposite side of said tilt axis from said outer north pole portion, a fixed annular electromagnet concentric to the axis of said drive shaft having an outer annular pole portion disposed in spaced adjacent relation substantially opposite said outer pole portions of said permanent magnet means and an inner annular opposite pole portion adjacent said shaft, an annular concentric energizing coil in said electromagnet between said annular outer and inner pole portions thereof for energizing said inner and outer pole portions to provide an annular outer south pole portion and an inner annular north pole portion incident to current flow in said coil in one direction and to reverse said outer and inner annular polarity incident reverse current flow in said coil, and reverse switch means for reversing the current flow in said energizing coil during rotation of said shaft, whereby to move said mirror during rotation thereof selectively to said inclined position for producing nutation of said mirror, or to perpendicular relation to the axis of said shaft to eliminate nutation thereof.

3. In an optical infrared scanning device having a central axis, a spherical concave mirror concentric to said axis for receiving infrared rays and reflecting the same in the opposite direction toward said central axis, a spinner structure rotatable about said central axis, a drive shaft fixed in said spinner structure concentric to said central axis for rotating said shaft, a circular flat mirror structure pivoted to said shaft on an axis adjacent to and transverse to said central axis for limited tilting movement thereof between a position perpendicular to said central axis and on a predetermined inclined position relative to said central axis during rotation thereof by said spinner, a circular ring-type permanent magnet concentrically fixed to the back of said mirror magnetized through its diameter parallel to said mirror tilt axis to dispose the opposite poles thereof at diametrically opposite sides of the mirror tilt axis, a stationary circular electromagnet having an annular outer pole portion disposed in spaced adjacent relation to the periphery of said annular permanent magnet and an annular inner pole portion disposed adjacent the central axis inwardly relative to said annular permanent ring magnet, an annular energizing coil fixed in said electromagnet between the annular outer and inner pole portions thereof in concentric relation to said central axis, and reversing switch means for selectively energizing said coil to cause current flow therein in one direction or in the opposite direction to reverse the polarity of the inner and outer annular pole portions of said electromagnet during rotation of said mirror by said spinner to substantially instantaneously shift the plane of said circular flat mirror between its position perpendicular to said central axis and said predetermined tilted position relative to said central axis.

4. In an optical infrared reflecting device having a central axis, a concave spherical mirror fixed in concentric perpendicular relation to said axis for receiving infrared radiation from a distant target and reflecting the rays forwardly and inwardly toward said central axis, a drive shaft rotatable on said central axis, means for rotating said shaft uniformly, a flat circular support pivoted substantially on its diameter on said shaft on a tilt axis perpendicular to said central axis, a flat circular mirror fixed on said circular support parallel thereto facing said spherical concave mirror for reflecting rays received from said concave mirror inwardly in the opposite direction toward said central axis, stop means between said support and said drive shaft for limiting tilting movement of said support about said tilt axis during rotation thereof between a position perpendicular to said central axis and a predetermined tilted position relative to said central axis, permanent magnet means fixed to the back of said support having a north pole portion adjacent the periphery of the support in a plane perpendicular to said tilt axis and an opposite south pole portion in the same plane at the opposite side of said tilt axis adjacent the periphery of said support, a stationary disk-like annular electromagnet perpendicular to said central axis having an outer annular concentric pole portion disposed in spaced adjacent relation to the periphery of said support and outer pole portions of said permanent magnet means and an annular concentric inner opposite pole portion spaced inwardly from the annular outer pole portion, an annular concentric energizing field coil in said electromagnet means between said outer and inner annular pole portions, whereby reversal in current flow in said electromagnet coil reverses the polarity of said outer and inner annular pole portions of said electromagnet, and means connected to said field coil for selectively reversing the current flow therein during rotation of said shaft, whereby current flow through said field coil in one direction causes the outer pole portion of the permanent magnet at one side of the support tilt axis to be attracted while the opposite outer pole portion at the opposite side of the tilt axis is repulsed, to tilt or move the support and mirror in one direction to one of its positions, while reverse current flow through said field coil causes the opposite outer pole portion of the permanent magnet to be attracted and the other pole thereof to be repulsed to tilt or move the support and mirror in the opposite direction to its other position.

5. A device as set forth in claim 4 wherein the permanent magnet means comprises a ring magnet magnetized through its diameter and concentrically fixed to the support adjacent the periphery thereof with the north and south pole portions positioned in a plane perpendicular to the pivot axis of the support on the shaft at opposite sides of said pivot axis, and said annular electromagnet comprises a circular outer concentric pole portion fixed opposite to and spaced from the permanent ring magnet means, and said energizing field coil is recessed in the annular electromagnet structure concentrically between the circular outer concentric pole portion thereof and the central portion thereof to provide annular concentric pole portions at the outer and inner sides of the field coil, and said electromagnet is formed with a concentric circular opening in its center, and said drive shaft is rotatably journalled in said concentric circular opening.

6. Apparatus as set forth in claim 5 including a concentric spinner structure having the opposite end of the shaft fixed therein for rotating the shaft, including lens means concentric to said shaft for receiving infrared rays reflected by the tiltable support carried mirror, and infrared detector means concentrically fixed relative to said central axis and said spinner for receiving and detecting infrared rays reflected by said tiltable support carried mirror passing through said lens means, and means for rotating said spinner.

7. Apparatus as claimed in claim 6 including means for energizing said field coil, and means for selectively reversing the direction of current flow therein.

No references cited.

JEWELL H. PEDERSEN, *Primary Examiner.*

F. L. EVANS, *Assistant Examiner.*